Jan. 16, 1968     D. L. P. HAMILTON     3,364,299
PROTECTIVE ENCLOSURE FOR THE JUNCTION BETWEEN
A BURIED UTILITY CABLE AND AN UNDERGROUND
SERVICE LEAD AND METHOD OF
MAKING THE SAME

Filed June 15, 1967     3 Sheets-Sheet 1

Inventor
Douglas L. P. Hamilton
By
Attorney

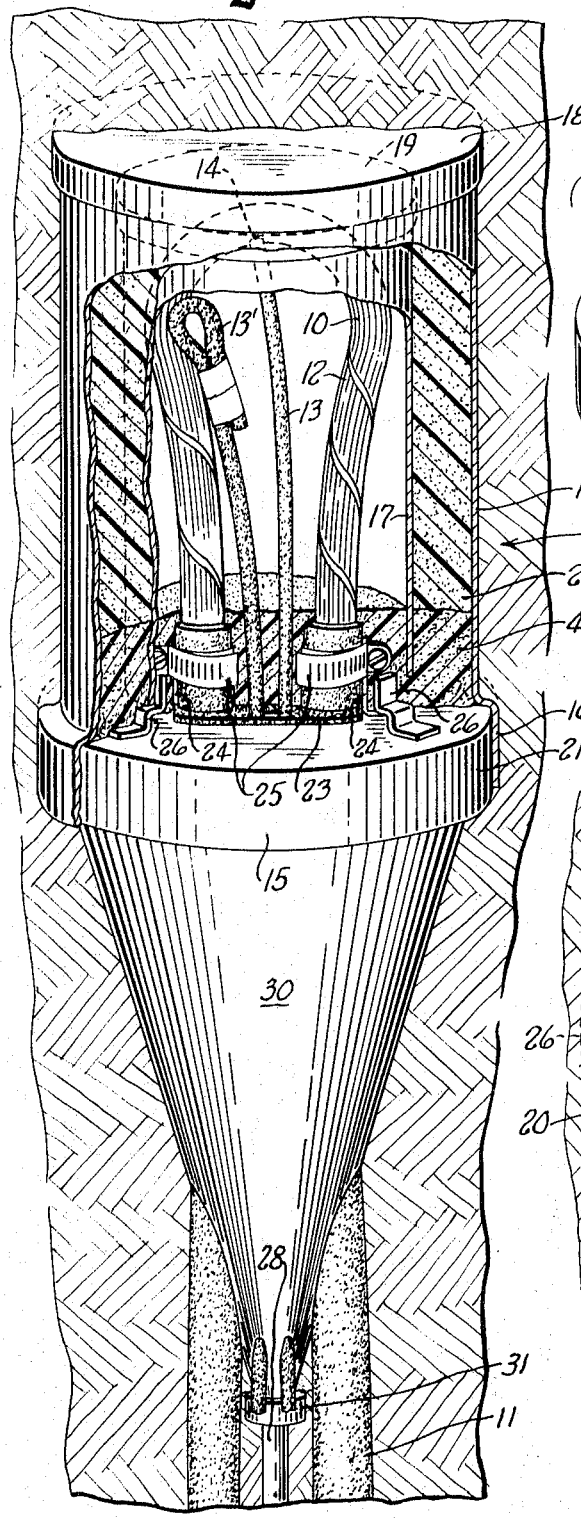
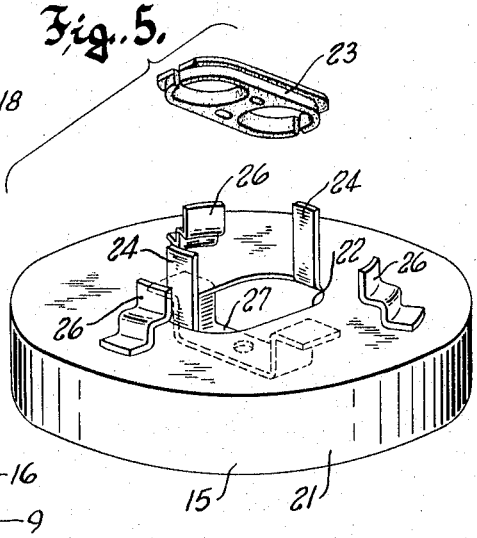
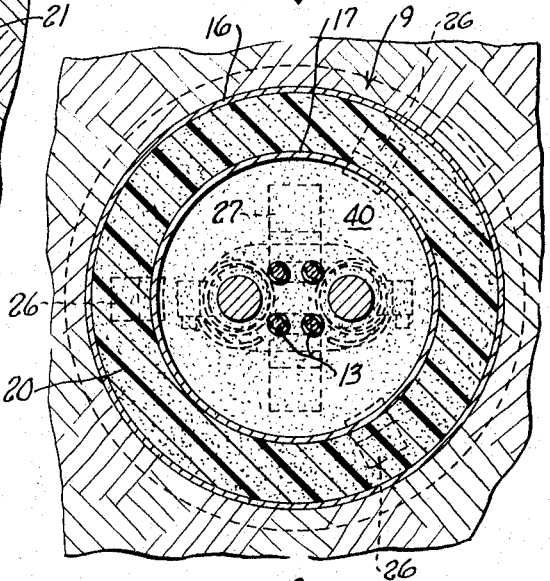

United States Patent Office 3,364,299
Patented Jan. 16, 1968

3,364,299
PROTECTIVE ENCLOSURE FOR THE JUNCTION BETWEEN A BURIED UTILITY CABLE AND AN UNDERGROUND SERVICE LEAD AND METHOD OF MAKING SAME
Douglas L. P. Hamilton, c/o Utility Products Co., 3111 W. Mill Road, Milwaukee, Wis. 53209
Continuation-in-part of application Ser. No. 522,082, Jan. 21, 1966. This application June 15, 1967, Ser. No. 649,787
11 Claims. (Cl. 174—37)

ABSTRACT OF THE DISCLOSURE

The junction between an underground service lead and the tapping loop of a buried utility cable projects upwardly through a hole in a metal base plate that is set into a hole in the ground. A pair of inner and outer shells, the latter being taller and larger in diameter than the former, coact with the base plate and removable covers which close the upper ends of the shells, to form a double walled enclosure for the tapping loop and the adjacent portion of the service lead; and a body of moisture impervious material that fills the lower portion of the outer shell to a level above the bottom edge of the inner shell coacts with moisture impervious material that fills the space between the shells and between their covers, to completely seal the interior of the enclosure against ingress of moisture.

---

This invention like that of my copending application Ser. No. 522,082 filed Jan. 21, 1966, of which this application is a continuation-in-part, relates to subterranean utility cables and has more particular reference to a method and means for protecting the junctions between the tapping loops of such cables and the service leads connected thereto.

As disclosed in my Patent No. 2,916,539, issued Dec. 8, 1959, it has been possible for some time to supply telephone service and/or electric power by means of underground utility cables. Heretofore, though both the utility cable and the service leads were buried in the ground, it was customary to provide the utility cable with above ground tapping loops at predetermined intervals along its length, and to also bring the service leads up out of the ground for connection to conductors of the cable at the tapping loops thereof. This was due, in part, to the necessity for protecting the electrical junctions between the service leads and the tapping loops of the cable against moisture and even water present in the ground, and in part to the need for having those junctions readily accessible to a serviceman for inspection or for connection of additional service leads to the tapping loops.

My aforesaid Patent No. 2,916,539, concerns an enclosure for the above ground junctions between the tapping loops of subterranean cables and their service leads, for protecting said junctions from the elements while rendering them readily accessible for servicing. While these above ground enclosures have proven to be practical and well adapted to the purpose for which they were devised, they are often regarded as an eyesore in many residential areas. Nevertheless, to this date there has been no practicable way of protecting the junctions between the tapping loops of subterranean utility cable and their service leads which would enable the tapping loops and leads to remain entirely underground.

With that objective in view, it is the purpose of this invention to provide a protective underground enclosure for a service lead and the tapping loop of a buried utility cable to which it is joined, which will effectively protect the junction from moisture and/or water present in the ground and at the same time enable access to be had to said junction without undue difficulty.

As will no doubt be appreciated, the connection of a service lead to the proper conductors of a cable entails removal of the cable sheath to afford access to its conductors. Such "opening" of the cable, either for the purpose of enabling a service lead to be connected to certain of its conductors or to permit splicing of the cable to another, exposes the conductors as desired, but it also gives rise to the objectionable possibility of moisture entering the cable, especially in the case of telephone cables. This always has been a problem in the industry, and to cope with it, it has been necessary in the past to apply a cap of suitable moisture-proofing material, such as an epoxy resin to each severed end of the cable sheath.

This invention obviates the need for such capping of the severed ends of the cable sheath by providing a moisture-proof enclosure for the entire opened portion of the cable, so constructed and designed that access to the interior of the enclosure may be had when required without damaging the cable, even when the entire enclosure is buried below ground level. Moreover, the enclosure of this invention may be resealed after such opening thereof, and when resealed will be just as effective and secure as when originally produced.

With the above and other objects in view which will appear as the description proceeds, this invention resides in a novel method and article substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 2 is an enlarged perspective view of the enclosure seen in FIGURE 1, with parts thereof broken away and shown in section;

FIGURE 4 is a cross sectional view taken through FIGURE 3 along the line 4—4;

FIGURE 5 is an exploded perspective view of the base portion of the enclosure.

Figure 1:
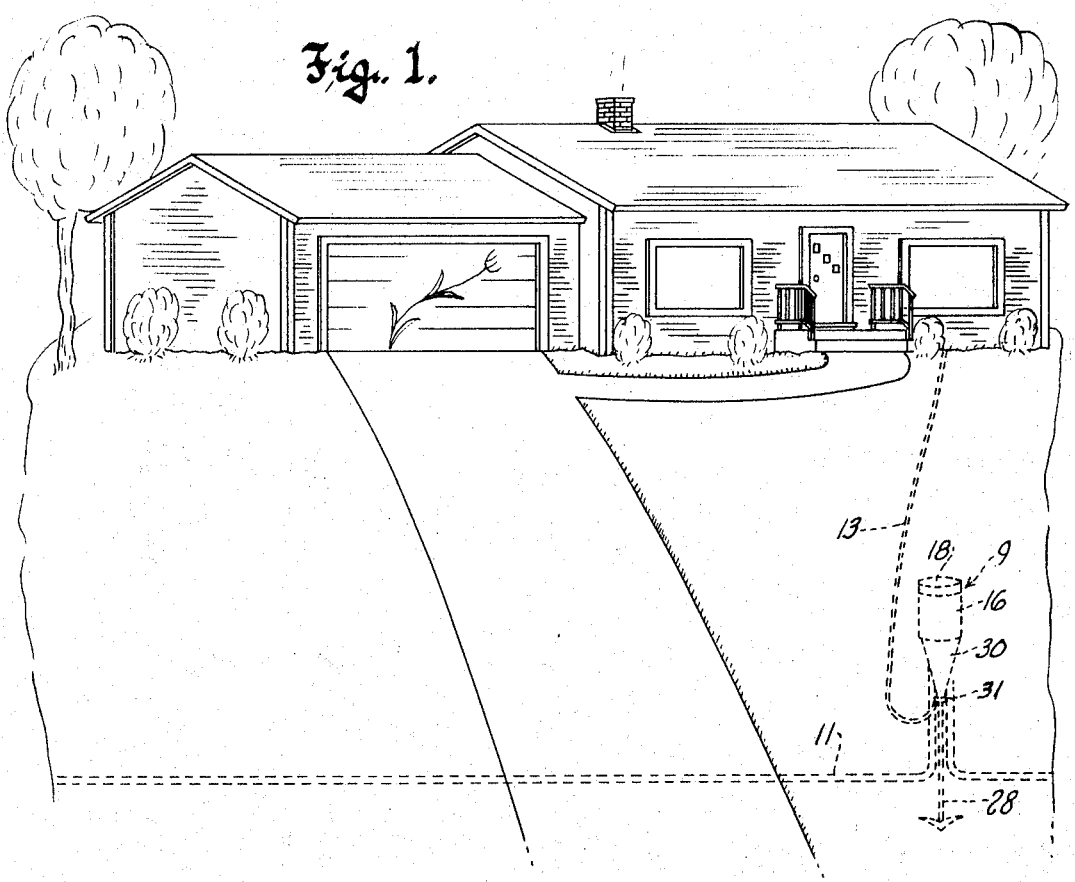
FIGURE 1 is a perspective view illustrating an underground utility cable and service lead installation employing the protective enclosure of this invention for the junction between the cable and lead.

Referring now to the accompanying drawings, the numeral 9 generally designates the enclosure of this invention, the purpose of which is to house and protect an opened portion of a cable, as for instance an underground tapping loop 10 of a subterranean utility cable 11, from which the sheath has been removed to expose its conductors 12 so that an underground service lead 13 may be connected to certain of the cable conductors, as at 14. The enclosure may be wholly buried in the ground as shown or only partially buried. If wholly buried, no part of the tapping loop 10 or the end portion of the service lead 13 connected thereto, is above ground level.

The enclosure comprises a metal base plate 15, a cylindrical metal outer shell 16 set onto the peripheral portion of the base plate, a smaller diameter and shorter cylindrical inner shell 17 within the outer shell, removable covers 18 and 19 for the upper ends of the outer and inner shells, and moisture-proof material 20 filling all space between the shells and their covers and covering the base plate to a depth sufficient to embed the lower edge portion of the inner shell. This provides a moisture-proof enclosure or housing for the opened portion of the cable, that is, the tapping loop 10, and the adjacent portion of the service lead, as will be shown permits access to the interior of the enclosure when such access is desired, as for the connection of additional service leads to the cable, without danger of damaging the cable.

The base plate 15 is preferably an inverted dish-shaped metal stamping having a downturned marginal flange 21 and a generally oval shaped centrally located hole 22, into which a rubber grommet 23 is fitted. (See FIGURE 5.) At the opposite ends of the oval hole there are upstanding projections 24 to provide cable anchoring members to which the severed end portions of the cable are secured, as by hose clamps 25, the portions of the cable directly below the clamps being snugly received in the holes in the grommet, as is also the service lead 13 and one or more additional leads 13' which provide for future subscribers.

The outer shell 16 has an enlarged lower end portion 16' which snugly telescopes over the base plate so that when in position the shell 16 is firmly attached to the base plate and rises perpendicularly therefrom. The cover 18 which closes the upper end of the outer shell may be removably attached thereto in any suitable way.

Secured to the top of the base plate 15 in circumferentially spaced relation are three supporting brackets 26 which together support the inner shell coaxially within the outer shell, with its lower edge spaced above the base and its upper end at a level below that of the upper edge of the outer shell.

The cover 19 for the top of the inner shell, though removable, preferably has a tight fit on the inner shell, so that when in place, it coacts with the inner shell to form a bell jar.

Secured to the underside of the base plate, and spaced downwardly therefrom, is a diametrically extending strap or cleat 27 with a hole therethrough on the axis of the enclosure. The upper end portion of an anchor rod 28 which is driven into the ground, passes through this hole in the strap or cleat, and a nut 29 threaded on the rod and bearing against the strap or cleat secures the enclosure against upward displacement by frost heaving; it being understood that the anchor rod is suitably secured against withdrawal.

Further assurance against upward displacement of the enclosure is provided by an inverted cone 30 the upper open end of which is nested into the flanged peripheral portion of the base plate and the apex of which has the anchor rod extended therethrough. A collar or shoulder 31 on the rod bearing against the apex of the cone, holds the cone assembled with the base plate. Because of the sloping sides of the cone, upward forces resulting from frost heave and exerted upon the cone are considerably less than they would be if applied directly to the underside of the base plate.

However, in climates not subject to frost heave, the cone 30 is not needed; but the anchor rod is always used to establish the grade or elevation of the enclosure.

Figure 6:
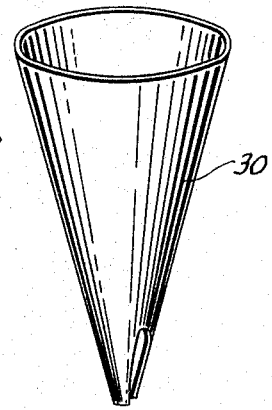
FIGURES 6 and 7 are perspective views of one of the parts of the complete structure, illustrating two ways of making this part.
Figure 7:
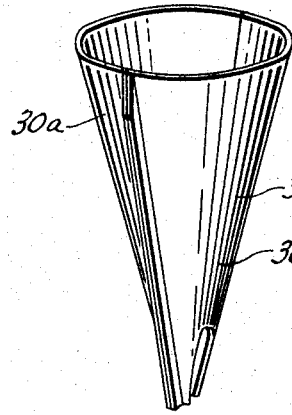
Figure 3:
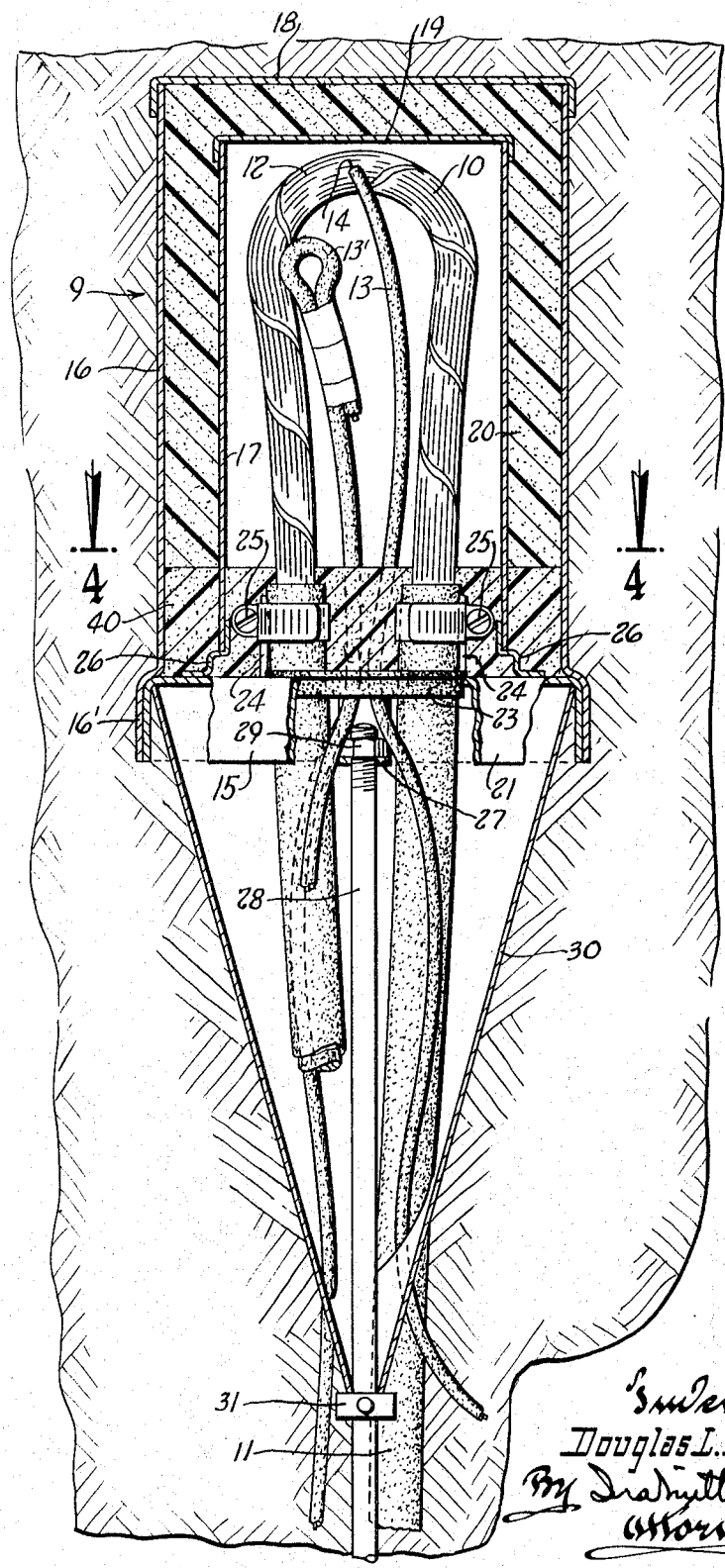
FIGURE 3 is a vertical sectional view through the enclosure.

As shown in FIGURE 6 the cone 30 may be a one part unit or, as shown in FIGURE 7, it may consist of two complementary half sections 30ª and 30ᵇ.

In any event, the lower apex portion of the cone has holes to accommodate the looped portion of the cable and the service leads, all of which extend upwardly through the cone and through the base plate into the interior of the moisture-proof enclosure, specifically the space within the inner shell.

The moisture-proof or moisture impervious material 20 which fills the space between the inner and outer shells and the bottom portion of the outer shell may be any one of the so called foaming-type resins or plastics such as polyurethane, polyvinyl chloride, polyethylene, polypropylene, polystyrene, epoxy resin, silicone foam, urea formaldehyde or cellulose acetate; or it may be a nonfoaming moisture-proof material such as tar or pitch.

In the installation of the enclosure of this invention, assuming that the utility cable is in place with loops at spaced locations where it is expected that service connections are to be made, and that the service lead or leads are also in place, and assuming also that the climate requires the use of the anchor rod 28 and the cone to assure again upward displacement of the enclosure by frost heave; after a hole is dug to uncover the loop in the cable and the adjacent end portions of the service leads, the anchor rod is driven into the bottom of the hole. Of course, in doing this, care must be exercised to avoid damaging the cable.

The cone 30 is next set into the hole with the cable loop and the service leads entering the same through the holes in its apex portion. The base plate is now set into position with the cable loop and the service leads passing through the oval hole 22 therein. In placing the base plate in position, the threaded end of the anchor rod is passed through the hole in the strap or cleat 27 and the flanged peripheral portion of the base plate is properly set onto the upper edge of the cone. Now the nut 29 may be screwed onto the anchor rod and tightened against the strap or cleat. This secures the base plate in place.

The service leads are next threaded through the appropriate holes in the rubber grommet 23, as is also the looped portion of the cable, and to enable the latter to be done, the grommet has slits in its opposite end portions leading to its cable receiving holes. The grommet is now pushed down onto the base plate to close the hole therein, and with this done, the hose clamp 25 may be applied to clamp the leg portions of the cable to the supporting members 24 on the base plate.

If desired, the sheath may be stripped from the loop portion prior to the securement of the cable legs to the supporting members 24, but if not, the sheath is stripped therefrom after the cable legs have been anchored. In either event the conduits of the cable are exposed and the tapping loop 10 is thus formed. Now the service lead connection 14 can be made. This done, the inner and outer shells are set into place, the former, onto the supporting brackets 26 and the latter onto the base plate.

The assembly is now ready for the application of the moisture-proof material.

If a foaming type material is used, a quantity thereof is poured into the shells to a depth sufficient to assure that when foamed and set a body 40 of moisture-proof or moisture impervious material covers the entire base plate and grommet, and tightly closes all unoccupied openings therein, encapsulates the anchored portions of the cable and the open ends of its sheath, and embeds the lower edge portion of the inner shell as well as the portion of the service leads rising from the grommet.

The cover 19 of the inner shell is now applied, and thereupon more moisture-proof or moisture impervious material is poured into the outer shell 16 right onto the cover 19 of the inner shell. The amount of material thus introduced into the outer shell should be enough to assure that all space between the shells and above the cover 19 of the inner shell will be filled when that material foams and sets.

The cover 18 of the outer shell is next put on, and then the hole in the ground is filled in around and over the completed enclosure.

If subsequent access into the enclosure is necessary, the ground thereabove can be dug away to expose the cover 18 of the outer shell, which may then be removed. With the removal of the cover 18 the foamed plastic filling the upper portion of the outer shell can be cut away with assurance that in doing so, no part of the cable will be damaged, and when it is cut away the cover 19 of the inner shell can be removed.

Resealing of the enclosure requires only the replacement of the inner cover 19, pouring some foaming moisture-proof resin into the top of the outer shell to merge with and bond to the foamed material between the shells; and finally replacement of the outer cover.

If a nonfoaming moisture-proof material is employed, the bell jar effect of the inner shell with its cover in place may be utilized to advantage. In this case the liquified moisture-proof material is simply poured into the outer shell and as it is, it first covers the base plate to a depth similar to that of the body 40 and thereafter rises in and fills the annular space between the shells and above the covered top of the inner shell, being excluded from the upper portion of the interior of the inner shell by the bell jar effect.

With either material the severed ends of the cable sheath being embedded in the material covering the base plate will be effectively sealed, and ingress of moisture into the enclosure will be precluded.

From the foregoing description, together with the accompanying drawings, it will be apparent that the underground protective enclosure of this invention and the method of making the same disclosed herein, makes it possible for the first time to provide adequately protected and inexpensive underground junctions between the tapping loops of subterranean cable and underground service leads, while at the same time enabling access to be had to such underground junctions.

What is claimed as my invention is:
1. In combination:
(A) an underground utility cable having a portion providing a tapping loop;
(B) an underground service lead electrically connected to conductors of the cable at said tapping loop; and
(C) a moisture-proof enclosure for the junction between the tapping loop and the service lead and the adjacent portions thereof, said enclosure comprising
   (1) a base having an opening through which the tapping loop and the service lead pass from beneath the base to the space thereabove;
   (2) an inverted cup-shaped inner shell supported upon the base and containing the tapping loop and the adjacent portion of the service lead,
      the inner shell having a removable cover portion at its top,
   (3) an inverted cup-shaped outer shell embracing the inner shell in spaced relation thereto,
      the lower edge of said outer shell being joined to the base and the top of the outer shell having a removable cover portion,
   (4) a body of moisture-proof material filling the the lower portion of the outer shell, said body of moisture-proof material having the lower edge portion of the inner shell embedded therein and encapsulating the portion of the tapping loop and of the service lead directly above the base and closing all unoccupied portions of the opening in the base,
      so that said body seals the bottom of the enclosure against ingress of moisture, and
   (5) moisture-proof filling the space between the inner and outer shells, and joining said body of moisture-proof material which fills the lower portion of the outer shell
      so that the interior of the inner shell is fully protected against ingress of moisture whether the enclosure is wholly or partially below ground level.

2. The combination of claim 1, further characterized by at least one other service lead having an end portion thereof entering the enclosure through the opening in the base, for future use,
   whereby upon removal of any ground above the enclosure, the lifting of the removable cover portions of the outer and inner shells and the moisture-proof material between said cover portions, such other service lead may be connected to conductors of the tapping loop without disturbing the connection of the existing service lead with the tapping loop and without danger of damage to the cable.

3. The combination of claim 1, wherein the base has cable anchoring members to which the opposite end portions of the tapping loop are clamped,
   said cable anchoring members and the means clamping the cable portions thereto being embedded in the body of moisture-proof material filling the lower portion of the outer shell.

4. The combination of claim 1, wherein the outer shell is taller than the inner shell;
   and further characterized by spaced supporting members between the lower edge of the inner shell and the base, said supporting members holding the inner shell in a position at which its upper edge is below the level of the upper edge of the outer shell and the lower edge of the inner shell is spaced above the base,
      the space between the lower edge of the inner shell and the base providing for continuation of the body of moisture-proof material across the base beneath the lower edge of the inner shell, and the difference in elevation of the upper edges of the shells providing space for the moisture-proof material between the cover portion of the shells.

5. The combination of claim 1, wherein said moisture-proof material is a foamed plastic.

6. The combination of claim 1, further characterized by an inverted conical shell projecting downwardly from the peripheral portion of the base coaxially therewith,
   the portions of the tapping loop and of the service lead which project down from the base extending through the conical shell and emerging therefrom near its apex,
      said inverted conical shell minimizing the likelihool of upward displacement of the enclosure when buried in ground subject to frost.

7. The combination of claim 6, further characterized by an anchor rod attached to the base and extending downwardly therefrom axially through the inverted conical shell, for securing the enclosure against upward displacement from a buried position.

8. In combination:
(A) an underground utility cable having its sheath removed from a length thereof to provide an uncovered portion at which its conductors are exposed;
(B) another underground cable having its conductors connected to certain of the exposed conductors of the first cable; and
(C) a moisture-proof enclosure for the uncovered portion of the first cable, said junction of the conductors of the second cable with the certain conductors of the first cable and for the adjacent portion of the second cable, said enclosure comprising
   (1) a base having an opening through which said cables enter the enclosure from below;
   (2) an inverted cup-shaped shell forming a bell jar supported upon the base and containing the uncovered portion of the first cable, the adjacent portion of the second cable and said junction between conductors of the two cables,
      the inner shell having a removable cover portion at its top,
   (3) an inverted outer shell embracing the inner shell in spaced relation thereto,
      the lower edge of said outer shell being joined to the base and the top of the outer shell having a removable cover portion, (4) a body of moisture-proof material filling the lower portion of the outer shell,
    said body of moisture-proof material having the lower edge portion of the inner shell embedded therein and encapsulating the portion of the cables directly above the base and closing all unoccupied portions of the opening in the base,
        so that said body seals the bottom of the enclosure against ingress of moisture, and
(5) moisture-proof material filling the space between the inner and outer shells, and joining said body of moisture-proof material which fills the lower portion of the outer shell
    so that the interior of the inner shell is fully protected against ingress of moisture whether the enclosure is wholly or partially below ground level.

9. The method of providing moisture-proof protection for an opened portion of a buried utility cable, the junction of certain of its exposed conductors with conductors of another cable, and the adjacent portion of said other cable, both cables passing through a hole in a base plate, said method comprising the steps of:
  (A) setting the base plate in a hole in the ground with said cable portions projecting therethrough from the bottom and the opened portion of the first cable, said junction and the adjacent portion of the other cable above the base plate;
  (B) placing an inverted cup-shaped inner shell into the hole over the opened portion of the first cable, said junction and the adjacent portion of the other cable, with the lower edge of said inner shell spaced above the base plate;
  (C) placing a larger and taller outer shell into the hole around the inner shell with the lower edge of the outer shell seated on the base plate and its upper edge above the level of the top of the inverted cup-shaped inner shell, to provide an annular space around the inner shell which space is communicated at its bottom with the interior of the inner shell and at its top with the space above the top of the inner shell; and
  (C) pouring moisture-proofing medium into the outer shell to thereby fill the lower portion of the space within the inner shell to a level determined by the bell jar effect of the inverted cup-shaped inner shell but above the lower edge of the inner shell and to completely fill the annular space between the shells and also the space in the outer shell above the top of the inverted cup-shaped inner shell, to thereby embed the portions of the cables directly above the base plate as well as the lower edge portion of the inner shell in said medium and form a complete moisture-proof barrier around the space within the inner shell.

10. The method of providing moisture-proof protection for an opened portion of a buried utility cable, the junction of certain of its exposed conductors with conductors of another cable, and the adjacent portion of said other cable, both cables passing through a hole in a base plate, said method comprising the steps of:
  (A) setting the base plate in a hole in the ground with said cable portions projecting therethrough from the bottom and the opened portion of the first cable, said junction and the adjacent portion of the other cable above the base plate;
  (B) placing an inverted cup-shaped inner shell into the hole over the opened portion of the first cable, said junction and the adjacent portion of the other cable with the lower edge of said inner shell spaced above the base plate;
  (C) placing a larger and taller outer shell into the hole around the inner shell with the lower edge of the outer shell seated on the base plate and its upper edge above the level of the top of the inverted cup-shaped inner shell, to provide an annular space around the inner shell which space is communicated at its bottom with the interior of the inner shell and at its top with the space above the top of the inner shell;
  (D) pouring a foaming type moisture-proofing medium into the shells and allowing it to foam and set into a body which fills the lower portion of both shells to a level above the lower edge of the inner shell and embeds the portions of the cables directly above the base plate as well as the lower edge portion of the inner shell;
  (E) pouring a foaming type moisture-proofing medium into the annular space between the shells and allowing it to foam and fill the entire annular space and also the space in the outer shell above the top of the inverted cup-shaped inner shell to form walls which coact with the previously formed body of moisture-proofing medium to form an unbroken moisture-proof barrier all around the space within the inner shell.

11. A moisture proof enclosure for the junction of an underground service lead with certain conductors of an underground utility cable, at a tapping loop in the cable, comprising:
  (A) a base having an opening through which the tapping loop and the service lead pass from beneath the base to the space thereabove;
  (B) an inverted cup-shaped inner shell supported upon the base and containing the tapping loop and the adjacent portion of the service lead,
      the inner shell having a removable cover portion at its top;
  (C) on outer shell embracing the inner shell in spaced relation thereto,
      the lower edge of said outer shell being joined to the base and the top of the outer shell extending above the level of the cover portion of the inner shell;
  (D) a body of moisture-proof material filling the lower portion of the outer shell,
      said body of moisture-proof material having the lower edge portion of the inner shell embedded therein and encapsulating the portion of the tapping loop and of the service lead directly above the base and closing all unoccupied portions of the opening in the base,
        so that said body seals the bottom of the enclosure against ingress of moisture; and
  (E) moisture-proof material in the space between the inner and outer shells and above the cover of the inner shell,
      so that the interior of the inner shell is protected against ingress of moisture whether the enclosure is wholly or partially below ground level.

References Cited
UNITED STATES PATENTS

| | | | |
|---|---|---|---|
| 477,218 | 6/1892 | McLeod | 174—38 X |
| 804,945 | 11/1905 | Handel et al. | 52—162 X |
| 900,382 | 10/1908 | Joynes | 174—87 X |
| 992,377 | 5/1911 | Moore | 137—370 X |
| 1,975,976 | 10/1934 | Robinson | 220—3.4 |
| 2,100,721 | 11/1937 | Parsons | 174—37 X |
| 2,184,574 | 12/1939 | Addie | 174—37 X |
| 2,944,170 | 7/1960 | Knapp et al. | 174—52 |
| 3,162,718 | 12/1964 | Gunthel | 174—38 |

FOREIGN PATENTS 699,502  11/1940  Germany.

Electrical World, Burndy Co. Advertisement, vol. 166, No. 8, Aug. 22, 1966, p. 88, copy in 174–37.

LARAMIE E. ASKIN, *Primary Examiner.*